3,499,031
DIAMINE PROCESS

Ralph W. Smith, Gulf Breeze, and Charles R. Campbell and Marion J. Mathews III, Pensacola, Fla., assignors to Monsanto Company, St. Louis, Mo., a corporation of Delaware
No Drawing. Filed Jan. 3, 1967, Ser. No. 606,551
Int. Cl. C07c 103/02
U.S. Cl. 260—558     9 Claims

ABSTRACT OF THE DISCLOSURE

This disclosure relates to a process for the preparation of aromatic diamines containing internal amide connecting linkages from simple phenylene diamines and nitroaroyl chlorides.

BACKGROUND OF THE INVENTION

The invention relates to a process for the preparation of diamines and, more particularly, to a batch or continuous process for the preparation of aromatic diamines containing internal amide connecting linkages from simple phenylene diamines and nitroaroyl chlorides with neutralization and reduction of the dinitro intermediate taking place without isolation of the intermediate.

There are a number of well known methods for the preparation of aromatic diamines most of which involve reduction of the corresponding dinitro compound. Simple diamines such as the phenylenediamines can in some instances be prepared via a nitro reduction step. For example, ortho-phenylene diamine is prepared by the reduction of ortho-nitroaniline, preferably with zinc dust and alkali. Meta-phenylene diamine is prepared from meta-dinitrobenzene, usually by reduction with iron and hydrochloric acid. Para-phenylene diamine can be prepared from para-nitroaniline. The synthesis of aromatic diamines containing internal aromatic amide linkages almost invariably involves preparation of a dinitro intermediate in solution which is isolated after neutralization of by-products, re-dissolved and then reduced to the corresponding diamine.

Typical reaction sequences for several classes of diamines are as follows:

(I)

ClCO—Ar—COCl + 2NH$_2$—Ar—NO$_2$ $\xrightarrow[\text{cool and precipitate}]{\text{condense at 50-60° C.}}$ NO$_2$—Ar—NHCO—Ar—CONH—Ar—NO$_2$ $\xrightarrow[+\text{H}_2]{\text{reduce}}$ NH$_2$—Ar—NHCO—Ar—CONH—Ar—NH$_2$ (II)

2NO$_2$—Ar—COCl— + NH$_2$—Ar—NH$_2$ $\xrightarrow[\text{cool and precipitate}]{\text{condense at 50-60° C.}}$ NO$_2$—Ar—CONH—Ar—NHCO—Ar—NO$_2$ $\xrightarrow[+\text{H}_2]{\text{reduce}}$ NH$_2$—Ar—CONH—Ar—NHCO—Ar—NH$_2$ where Ar is an aromatic hydrocarbon such as phenylene, naphthylene or biphenylene.

An important and time consuming step is the precipitation, recrystallization, filtering, drying and then redissolving of the dinitro intermediate before reduction. Elimination of this isolation and purification step would improve the process economics considerably.

SUMMARY OF THE INVENTION

Accordingly, it is an object of this invention to provide an improved process for the preparation of aromatic diamines containing internal amide connecting linkages.

Another object is to provide a continuous process for the preparation of aromatic diamines containing internal amide connecting linkages which avoids the costly dinitro intermediate isolation step of the conventional process.

An additional object of the invention is to provide a process for the preparation of aromatic diamines containing internal amide connecting linkages which involves dinitro intermediate preparation, neutralization and reduction to diamine in a continuous operation using the same liquid reaction medium for dinitro formation and reduction.

Yet another object is to provide internal amide linked aromatic primary diamines of high purity which in turn may be polymerized with diacid halides to produce polyamides of improved viscosity.

The process generally involves a series of steps carried out in sequence and may be illustrated as follows:

(1) Preparation of dinitro intermediate by the reaction of a nitro acid halide, such as m-nitrobenzoyl chloride with an aromatic diamine, such as m-phenylene diamine, in solution in a suitable organic solvent, for example dimethylacetamide.

(2) Neutralization of the HCl or other acid byproduct formed with a suitable neutralizing agent and removal of the precipitated salt.

(3) Transfer of the neutralized dinitro intermediate solution to the hydrogenation apparatus, and then carrying out the hydrogenation in the conventional manner to form the diamine. The transfer may take place immediately as in the preferred continuous operation or may be subsequent as in bath or semi-continuous operations.

The diamines which may be prepared by the process of the invention are those of the formula

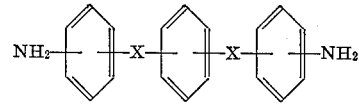

where X is CONH or NHCO in alternating sequence.

The process consists of the above steps being carried out in the order and manner described. The heart of the invention is the neutralization followed by direct hydrogenation of the dinitro intermediate reaction mixture. The product diamine thus obtained is of better quality (as evidenced by melting point and polymer properties) than that obtained by the procedure involving isolation of the intermediate dinitro compounds.

DESCRIPTION OF THE PREFERRED EMBODIMENTS

The individual steps of the process in part are based on prior art practices. Step (1) describes a known reaction for the preparation of aromatic dinitro compounds and is essentially the conventional method used to obtain such compounds. The aromatic dinitro intermediates used in the practice of the invention may be shown by the formula

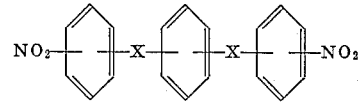

where X is CONH or NHCO in alterating sequence. The selection of compounds for the preparation of the dinitro intermediates and the amounts of each will depend on the type of product desired. For example, in preparing the dinitro compounds shown previously in reaction sequences I and II, four different compounds are employed with two to one molar ratios.

Step (2) describes the neutralization of the HCl or other acid by-product formed in the dinitro reaction using a suitable neutralizing agent such as ammonia, sodium carbonate, sodium bicarbonate or any other neutralizing agent which does not interfere with the hydrogenation reaction and results in the improved diamine. The exact amount of neutralizing agent is not critical since it is only necessary that a sufficient amount of neutralizing agent be added to insure complete neutralization (100% excess usually) and a pH of above 5.5 and preferably 8.0 to 10.0 is reached.

Step (3) deals with the direct transfer and hydrogenation of the resulting dinitro solution. This is one of the main advantages offered by the described process (i.e., elimination of the isolation and purification step, prior to hydrogenation, which is necessary in the standard procedure). The neutralized solution may be used directly, without further purification, and a product of high quality obtained. Reduction of the nitro groups to amine groups may be accomplished by any of the well known catalytic hydrogenation methods such as Raney nickel and palladium on charcoal catalysts such as five percent palladium on charcoal and the like.

The preparation of the dinitro intermediate may be accomplished by means of a batch tank reactor, a continuous tank reactor, a continuous tube reaction or any other standard reactor. The reactants with some solvent, preferably dimethylacetamide, are added to the reactor with stirring and after about 1 to 45 minutes or more between about 50° and 100° C. the reaction is complete and the resulting dinitro solution is ready for neutralization.

In the neutralization step the neutralizing agent, preferably sodium bicarbonate, is added to the stirred dinitro solution until neutralization is complete and the apparent pH is from about 5.5 to 10.0 preferably about 8.0 or higher. The solution may be cooled to just above the solubility point of the dinitro intermediate to reduce the solubility of the salt of neutralization before it is removed by filtration, centrifugation or any other convenient method and the clear filtrate is then ready for hydrogenation. Substantially, all of the salt is removed and the amount left in solution, depending on the temperature and concentration of dinitro intermediate in the solvent, usually will be from about 0.1 to 1% based on total solution weight.

The invention is further illustrated by the following examples in which all parts and precents are by weight unless otherwise indicated. In the examples MMAB is m-phenylenebis(m-aminobenzamide), MMNB is m-phenylenebis(m-nitrobenzamide), MNBC is m-nitrobenzoyl chloride, MPD is m-phenylenediamine and DMAc is dimethylacetamide.

Example I

A 2.01 mole portion of MNBC was added to a stirred solution of 1.0 mole of MPD dissolved in 1381 g. of DMAc. The reaction flask was nitrogen blanketed. The addition time was 10 minutes and the reaction temperature was controlled at 50° C. by means of an ice bath. After addition was complete the reaction solution was held at 50° C. for 5 minutes and then neutralized with anhydrous ammonia over a 5 minute period. The solution was sparged with nitrogen for 5 minutes and then filtered to remove ammonium chloride. The resulting filtrate contained 0.6% NH$_4$Cl. The filtrate was charged to a 1-gallon stirred autoclave along with 45 g. Raney nickel catalyst. Hydrogenation was carried out at 100° C. and 25 p.s.i.g. The rate for hydrogen consumption was 2.7 standard liters/min./kilogram charged and was essentially constant for 30 minutes, decreasing rapidly to zero at this point. The charge was held an additional 3 hours at 110° and 25 p.s.i.g. with continued stirring. The charge was then drained from the clave through a filter to yield 1837 g. of filtrate. 1365 g. of the filtrate were placed in a stirred vessel and heated to 85° C. 3500 g. of water at 85° C. was then added dropwise over a thirty-minute period. The precipitated MMAB was recovered by filtration, repulped in 3500 g. of H$_2$O at 85°, refiltered, and dried at 100° C. in a vacuum oven. The dried MMAB weighed 211.5 (82%) and contained 23 p.p.m. nitro groups calculated as MMNB and less than 5 μeq./g. carboxylic acid. The product melted at 211–213° with a light amber color. The diamine was polymerized with terephthaloyl chloride following the solution polymerization procedures of U.S. 3,232,910 and the resulting polymer had an inherent viscosity of 2.48, good spinning characteristics, and acceptable physical properties.

Example II.—Neutralization using sodium carbonate and sodium bicarbonate

A 2.0 mole portion of molten MNBC was added to a stirred solution of 1.0 mole of MPD in 1381 g. of DMAc. The reaction flask was nitrogen blanketed. The addition time was 5 minutes and reaction temperature was allowed to increase to 50° C. The reaction mixture was stirred at 50° C. for 20 minutes following the addition period. The reaction mixture was then neutralized with a mixture of 220 g. sodium carbonate and 200 g. sodium bicarbonate. The solution was filtered to remove sodium chloride and unreacted sodium carbonate and sodium bicarbonate. The cake was washed with 300 g. of DMAc to wash off the mother liquor. The filtrate contained 0.29% sodium chloride and had a pH of 9.8. The filtrate was charged to a 1-gallon stirred autoclave along with 45 g. Raney nickel catalyst. Hydrogenation was carried out at 110° C. and 25 p.s.i.g. The rate of hydrogen consumption was 5.0 standard liters/min./kilogram charged and was essentially constant for 12 min., decreasing rapidly to zero at this point. The charge was held an additional 10 minutes at 100° C. and 25 p.s.i.g. with continued stirring. The charge was drained from the clave through a filter and yielded 1998 g. of filtrate. The filtrate was placed in a stirred vessel under nitrogen and heated to 85° C. 5000 g. of water at 85° C. was then added slowly over a 30 minute period. The precipitated MMAB was recovered by filtration, repulped in 5000 g. water at 85° C. refiltered and dried in a vacuum oven at 100–110° C. The dried MMAB weighed 301 g. and contained less than 50 p.p.m. nitro groups calculated as MMNB, less than 1 microequivalent/g. and 1.4 μeq./g. acidity. The product melted at 211.5–213.5° C. with a light amber color.

Example III.—Neutralization with sodium bicarbonate

A 2.01 mole portion of molten MNBC was added to a stirred solution of 1.0 mole of MPD in 1381 g. of DMAc. The reaction flask was nitrogen blanketed. The additional time was 7 minutes during which the reaction temperature was allowed to increase from 20° C. to 52° C. The reaction temperature was then controlled at 50° C. for 18 minutes. The reaction mixture was then neutralized at 50° C. with 357 g. of sodium bicarbonate over a 28 minute period. The solution was filtered at 50° C. and the sodium chloride and residual sodium bicarbonate cake was washed with 200 g. of DMAc. The filtrate contained 0.18% NaCl and had a pH of 8.9. The filtrate was charged to a 1-gallon stirred autoclave along with 35 g. of Raney nickel catalyst. Hydrogenation was carried out at 100° C. and 25 p.s.i.g. The rate of hydrogen consumption was 3.7 standard liters/min./kilogram charged and was essentially constant for 19 minutes, decreasing rapidly to zero at this point. The charge was held an additional 10 minutes at 100° C. and 25 p.s.i.g. with continued stirring. The charge was drained from the clave through a filter and yielded 1964 g. of filtrate. The filtrate was placed in a stirred vessel under nitrogen and heated to 85° C. 4911 g. of water at 85° C. was then added dropwise over a 30 minute period. The precipitated MMAB was recovered by filtration, repulped in 4911 g. H$_2$O at 85° C., refiltered and dried in a vacuum over at 100–110° C. The dried MMAB weighed 306.5 g. and contained less than 50 p.p.m. nitro groups calculated as MMNB, 1.4 μeq./g. aliphatic amine, and less than 1 μeq./g. acidity. The MMAB product melted at 212–213.5° C. with a light amber color.

Example IV.—Neutralization with sodium carbonate

A 2.01 mole portion molten metanitrobenzoyl chloride were added to a stirred solution of 1.0 mole of metaphenylene diamine in 1381 g. of DMAc. The reaction flask was nitrogen blanketed. The addition time was 5 minutes during which the reaction temperature was allowed to increase from 18° C. to 52° C. The reaction temperature was then controlled by means of an ice bath at 50° C. for 20 minutes. The reaction mixture was then neutralized at 50° C. with 762 g. of sodium carbonate over a 50 minute period at 50° C. The solution was filtered at about 50° C. and the sodium chloride and sodium carbonate cake was washed with 300 g. of DMAc. The filtrate contained 0.16% NaCl and had a pH of 10.0. The filtrate was charged to a 1-gallon stirred autoclave along with 45 g. of Raney nickel catalyst. Hydrogenation was carried out at 110° C. and 25 p.s.i.g. The rate of hydrogenation was 3.1 standard liters/min./kilogram charged and was essentially constant for 22 minutes, decreasing rapidly to zero at this point. The charge was held an additional 10 minutes at 110° C. and 25 p.s.i.g. with continued stirring. The charge was drained from the clave through a filter and yielded 1992 g. of filtrate. The filtrate was placed in a stirred vessel under nitrogen and heated to 85° C. 5081 g. of water at 85° C. was then added dropwise over a 30 minute period. The precipitated MMAB was recovered by filtration, repulped in 5081 g. of water at 85° C., refiltered and dried in vacuum oven at 100–110° C. The dired MMAB weighed 306.2 g. and contained less than 50 p.p.m. nitro groups calculated as MMNB, 1.4 μeq./g. aliphatic amine and less than 1 μeq./g. acidity. The MMAB melted at 212–213.5° C. with a light amber color.

Example V.—Preparation of polymer from the MMAB of Examples II–IV

A 3-liter capacity glass resin kettle was equipped with a variable speed agitator, a charging port for solids, and nitrogen gas inlet and outlet tubes. In this reactor, 208.7 g. (0.60 mole) of the dried MMAB and 57.1 g. of C.P. grade $CaCO_3$ were mixed into 1350 ml. of carefully dried dimethylacetamide solvent until the MMAB was dissolved. An external cooling bath was applied and the contents of the reactor was chilled to a temperature of −20° C. To the reactor was added 121.8 g. (0.60 mole) of flaked terephthaloyl chloride and an additional 210 ml. of solvent. The cooling bath was removed and the reaction mixture was allowed to warm to room temperature over a period of two and one-half hours. The polymer solution was heated to a temperature of 70–80° C. by an external bath and maintained at this temperature for 2 hours during which $CO_2$ gas was evolved. Stirring was maintained at an appropriate rate to provide good mixing and an atmosphere of dry nitrogen gas was maintained during the entire course of the reaction.

A vacuum line was attached to the gas outlet tube and the reactor was evacuated to 20–25 inches of mercury. The vacuum was maintained for 30 minutes to insure removal of all $CO_2$ gas.

The resulting polymer solutions were found to have solution viscosities at 26° C. when measured with a Brookfield viscometer and inherent viscosities, after precipitation in water and drying, as indicated.

POLYMER VISCOSITY

| Example | Solution viscosity | Inherent viscosity |
|---------|--------------------|--------------------|
| II      | 9,600 poises, 23° C. | 2.50 |
| III     | 8,576 poises, 26° C. | 2.58 |
| IV      | 5,920 poises, 26° C. | 2.42 |

The polymer solutions had essentially no color absorbance in the visible region.

Strong, flexible, white, fibers having good stability at temperatures up to 400° C. were spun from these polymer solutions.

There are a number of advantages in using the present process in addition to the elimination of the dinitro isolation and purification step. Any neutralizing agent is suitable that does not interfere with the hydrogenation step in a continuous system. Also, the diamine is of high purity and gives polymer with practically no discoloration.

We claim:
1. In a process for the preparation of a diamine which comprises the steps of
   (a) contacting phenylene diamine with a nitrobenzoyl halide in an organic solution to provide a dinitro intermediate represented by the formula

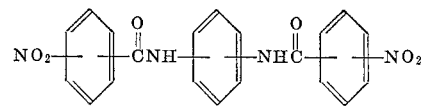

in solution with hydrogen halide by-product,
   (b) neutralizing the said hydrogen halide by-product formed in (a) and separating the resulting salt from the dinitro intermediate and
   (c) reducing the said dinitro intermediate to a diamine by catalytic hydrogenation, the improvement which comprises neutralizing the dinitro intermediate solution under essentially anhydrous conditions with a neutralizing agent to adjust the pH to between 5.5 and 10.0 and precipitate the thus formed halide salt and thereafter removing the precipitated salt prior to hydrogenation of the dinitro intermediate solution, using the same liquid reaction medium for dinitro formation and reduction.

2. The process of claim 1 wherein the acid halide is paranitrobenzoyl chloride.

3. The process of claim 1 wherein the acid halide is metanitrobenzoyl chloride.

4. The process of claim 1 wherein the phenylene diamine is para-phenylene diamine.

5. The process of claim 1 wherein the phenylene diamine is metaphenylene diamine.

6. The process of claim 1 wherein the neutralizing agent is ammonia.

7. The process of claim 1 wherein the neutralizing agent is sodium carbonate.

8. The process of claim 1 wherein the neutralizing agent is sodium bicarbonate.

9. The process of claim 1 wherein the reaction between a phenylene diamine and nitrobenzoyl halide is conducted in dimethylacetamide.

References Cited

UNITED STATES PATENTS

| 3,242,213 | 3/1966  | Preston et al. | 260—558 |
| 2,150,190 | 3/1939  | Rossander et al. | 260—558 |
| 3,291,824 | 12/1966 | Uskokovic | 260—518 |
| 3,049,518 | 8/1962  | Stephens | 260—558 |
| 3,049,564 | 8/1962  | Waring | 260—558 |
| 2,684,969 | 7/1954  | Krems et al | 260—558 |

HENRY R. JILES, Primary Examiner

H. I. MOATZ, Assistant Examiner